United States Patent [19]

Noguchi

[11] 4,383,262

[45] May 10, 1983

[54] LASER DATA RECORDING METHOD

[75] Inventor: Masaru Noguchi, Asaka, Japan

[73] Assignee: Fuji Photo Film Co., Ltd., Kanagawa, Japan

[21] Appl. No.: 243,212

[22] Filed: Mar. 12, 1981

[30] Foreign Application Priority Data

Mar. 28, 1980 [JP] Japan .................................. 55/40828

[51] Int. Cl.³ ..................... G01D 15/14; H04N 1/036; H01S 3/10
[52] U.S. Cl. .................................. 346/1.1; 346/76 L; 346/108; 430/945; 332/7.51
[58] Field of Search ...................... 346/76 L, 108, 1.1; 178/94; 430/945; 358/128.5, 297; 332/7.51

[56] References Cited

U.S. PATENT DOCUMENTS 4,015,221 3/1977 Dalton ............................ 346/108 X
4,225,873 9/1980 Winslow ......................... 346/137 X Primary Examiner—Stafford D. Schreyer
Attorney, Agent, or Firm—Sughrue, Mion, Zinn, Macpeak & Seas

[57] ABSTRACT

A laser data recording method in which data is recorded on a heat mode recording material with high sensitivity and low laser power. A scanned laser beam is adjusted to have a substantially circular configuration on the recording material with a diameter defined at an intensity value of $1/e^2$ of approximately one scanning line pitch on the recording material. The laser beam is intensity modulated in such a manner that the ratio of the laser beam intensity in the "on" state to the laser beam intensity in the "off" state is in a range of 1:0.24 to 1:0.53, more preferably 1:0.25 to 1:0.50.

3 Claims, 10 Drawing Figures

LASER DATA RECORDING METHOD

BACKGROUND OF THE INVENTION

The present invention relates to a laser data recording method with which data is recorded on a data recording material by scanning and modulating a laser beam.

Recently, a variety of laser data recording devices have been proposed in the art. Of these devices, a laser data recording device using a heat mode recording material is attractive because it does not require processing and real time recording is effected therewith. Such a device has been employed in recording original discs for a laser COM or a video disc.

In a heat mode laser data recording process, the recording medium absorbs a laser beam and converts its energy into thermal energy which induces physical or chemical changes in the medium so that detectable variations such a fusion, evaporation, deformation and phase changes are caused in the medium. Such a laser data recording process is specific in that it has a threshold characteristic, that is, a minimum laser power must be applied to effect the change. As a recording material of this type utilizing a thermal effect has a generally low sensitivity, it is necessary to provide a laser of considerably great power.

It is well known in the art that the amount of energy required for recording data on a heat mode data recording material depends on the recording speed. The sensitivity is improved if the recording sheet is subjected to exposure with a high illumination intensity for a short time. One method of subjecting the recording sheet to exposure with a high illumination intensity for a short time is to reduce the diameter of the laser beam and to increase the scanning speed.

As an example, with regard to a recorded image formed with 2000 scanning lines with a pitch of 5μ and a recorded image formed with 4000 scanning lines with a pitch of 2.5μ with the laser beam diameter reduced by half and with the scanning speed doubled with respect to the former, if the laser power is constant in both cases, then the same energy is applied to a point on the recording material in both cases. However, the intensity of illumination is increased four times and the exposure time is decreased to a quarter in the latter case.

Accordingly, in the latter case, the sensitivity is increased, and the laser power can be reduced as much as the increase of the sensitivity. However, it should be noted that this requires the laser beam scanning optical system to increase the optical resolution and the scanning speed and accordingly it is necessary to employ a relatively expensive optical system.

Accordingly, an object of the invention is to make it possible to efficiently record data on a heat mode data recording material with a laser beam without the above-described economical and technical difficulties.

SUMMARY OF THE INVENTION

In accordance with these and other objects of the invention, a laser data recording method is provided with which data is recorded on a data recording material by scanning and modulating a laser beam, wherein, according to the invention, the configuration in section of the laser beam on the data recording material is substantially circular, the diameter of the laser beam which is defined at an intensity value of $1/e^2$ thereof is about twice a scanning line pitch, and the laser beam is subjected to intensity modulation in such a manner that the ratio of a laser beam intensity in the "on" state to a laser beam intensity in "off" state is in a range of from 1:0.25 to 1:0.50.

BRIEF DESCRIPTION OF THE DRAWINGS

FIGS. 1A–1E are diagrams for a description of a conventional modulation method of which FIG. 1A is an explanatory diagram showing a modulation waveform, FIG. 1B an explanatory diagram showing the modulation waveform in correspondence to a position on a data recording material, FIG. 1C an explanatory diagram showing a laser beam on the data recording material, FIG. 1D an explanatory diagram showing the density of energy applied to the data recording material, and FIG. 1E an explanatory diagram showing the configuration of a recorded dot;

FIGS. 2A–2C are diagrams for a description of a modulation method according to the invention of which FIG. 2A is an explanatory diagram showing a modulation waveform, FIG. 2B an explanatory diagram showing a laser beam on a data recording material, and FIG. 2C an explanatory diagram showing the configuration of a recorded dot;

DESCRIPTION OF THE PREFERRED EMBODIMENTS

The invention will now be described in detail.

A laser beam having a power P and which is scanned in a direction x at a speed v in x-y coordinates on a recording material will be considered. If the intensity distribution of the laser beam is Gaussian, the beam radius defined at a point $1/e^2$ is w and the laser beam is subjected to intensity-modulation $\alpha(t)$ according to data to be recorded, then the density of energy applied to an arbitrary point on the recording material can be represented by the following expression.

$$E(x, y) = \frac{2P}{\pi w^2} e^{-\frac{2}{w^2} y^2} \int_{-\infty}^{\infty} e^{-\frac{2v^2}{w^2}(t - \frac{x}{v})^2} \alpha(t)dt. \quad (1)$$

This is a general equation for the density of energy applied to an arbitrary point on a recording material in a laser scanning data recording operation.

If the recording line width which is obtained when a heat mode data recording material having an energy density threshold $E_T$ is subjected to simple scanning exposure is represented by D, and $E(x,y)=E_T$, $y=D/2$ and $\alpha(t)=1$ in equation (1) above, then the following equation is obtained:

$$E_T = \sqrt{\frac{2}{\pi}} \cdot \frac{P}{wv} \cdot e^{-\frac{2}{w^2}(\frac{D}{2})^2}. \quad (2)$$

The equation (2) can be rewritten into the following equation:

$$D = w\sqrt{2\ln\left(\sqrt{\frac{2}{\pi}} \cdot \frac{P}{vE_T} \cdot \frac{1}{w}\right)}. \tag{2'}$$

With $dD/dw=0$, a beam radius $w_0$ with which the recording line width D is a maximum is:

$$w_0 = \sqrt{\frac{2}{\pi e}} \cdot \frac{P}{vE_T}. \tag{3}$$

In this case, the maximum recording line width $D_{max}$ is:

$$D_{max} = \sqrt{\frac{2}{\pi e}} \cdot \frac{P}{vE_T} = w_0. \tag{4}$$

The following can be understood from the above-described analysis. When, under the condition that the scanning speed v and the recording material threshold $E_T$ are constant, the laser beam radius w is made equal to D (D being the desired scanning line recording width), that is, the laser beam 2w is made equal to $2\times D$, the laser power P necessary for obtaining the recording width D is a minimum as a result of which the recording operation is carried out most efficiently.

On the other hand, in a laser scanning data recording operation with the scanning line recording width (or the scanning line pitch) being D, it may be required to record dots in the scanning direction which have a size substantially equal to D at the minimum. In the case of recording dots of the minimum diameter at the scanning position $x=0$ on the recording material, the following expression can be applied as the modulation waveform of equation (1):

$$\alpha(t) = \begin{cases} 1 \ldots -\frac{T}{2} \leq t \leq \frac{T}{2} \\ 0 \ldots t < -\frac{T}{2}, t > \frac{T}{2}, \end{cases} \tag{5}$$

where $$T=D/v. \tag{6}$$

Figure 1A:
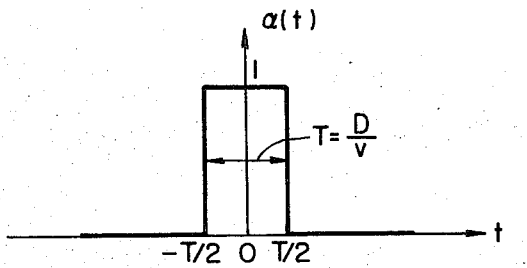

This modulation waveform is as shown in FIG 1A. If the modulation waveform is expressed as $\alpha'(x)$ in correspondence to a position on the recording material through a change of variable with $x=v\,t$, then $$\alpha'(x) = \begin{cases} 1 \ldots -\frac{D}{2} \leq x \leq \frac{D}{2} \\ 0 \ldots x < -\frac{D}{2}, x > \frac{D}{2}. \end{cases} \tag{7}$$

Figure 1B:
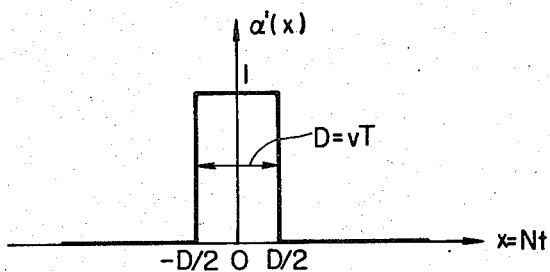

This is as indicated in FIG. 1B.

Figure 1C:
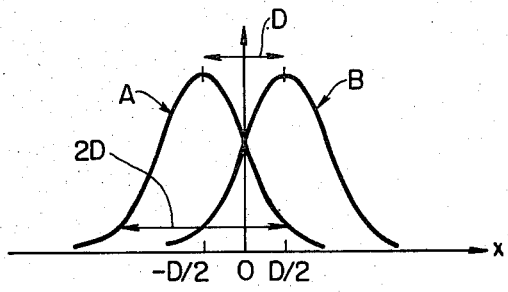
Figure 1D:
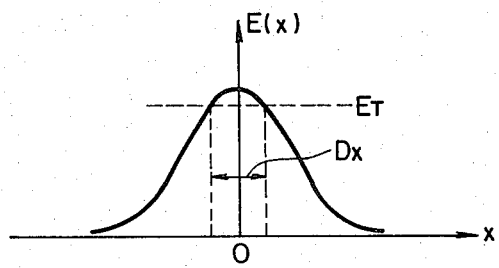
Figure 1E:
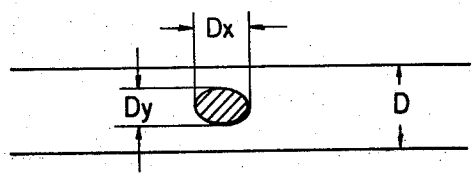

On the other hand, in the case where a laser beam of diameter $2W_0=2D$ is used in order to perform the recording operation efficiently, the intensity modulation is in the "on" state (i.e. $\alpha'(x)=1$) only for the period that the laser beam is moving from a beam position A (beam center $x=-D/2$) to a beam position B (beam center $x=D/2$) as shown in FIG. 1C. Therefore, the density of energy E(x) applied to a point in the scanning direction (i.e. the direction x) and on the center line of the scanning line on the recording material is not sharp as indicated in FIG. 1D. The size Dx of a dot at which the energy density E(x) exceeds the threshold $E_T$ is smaller than the scanning line width D and the size Dy in a direction perpendicular to the scanning direction is smaller than the size Dx. Accordingly, the configuration of the dot is as shown in FIG. 1E. If data is recorded with dots of such an unsatisfactory shape, the resultant image is too low in quality to be of practical use.

In order to solve this problem, a method may be employed in which the diameter of the laser beam on the recording material is made equal to D in a direction perpendicular to the scaning direction and made smaller than 2D in the scanning direction. With this method, the density of energy applied to the recording material is improved in the scanning direction and therefore a recorded dot of larger size can be obtained. However, it should be noted that with this method the optical resolution in the scanning direction must be improved; that is, the method suffers from economical and technical difficulties as in the above-described case.

No defocusing phenomenon is caused even if a recording material having a threshold characteristic is subjected to bias exposure lower than the threshold. In view of this fact, the size of dots which are recorded when various bias components are added to the modulation waveform $\alpha(t)$ have been investigated as a result of which it has been found that, by the addition of bias components in a certain range, the above-described effective recording conditions can be satisfied and the recorded images are significantly improved in quality.

Figure 2A:
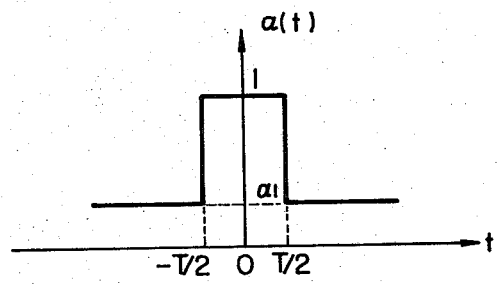

FIG. 2A shows a modulation waveform having a bias component, which is expressed as follows:

$$\alpha(t) = \begin{cases} 1 \ldots -T/2; \leq t \leq T/2. \\ \alpha_1 \ldots t < -T/2; t > T/2 \end{cases} \tag{8}$$

Figure 2B:
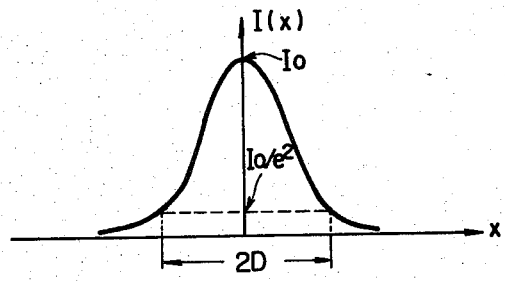

FIG. 2B shows the sectional intensity distribution of a laser beam whose diameter is defined by the following expression which is used to perform an efficient recording operation:

$$2w=2w_0=2D. \tag{9}$$

Figure 2C:
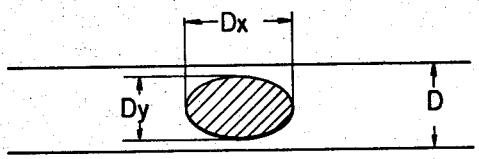
Figure 3:
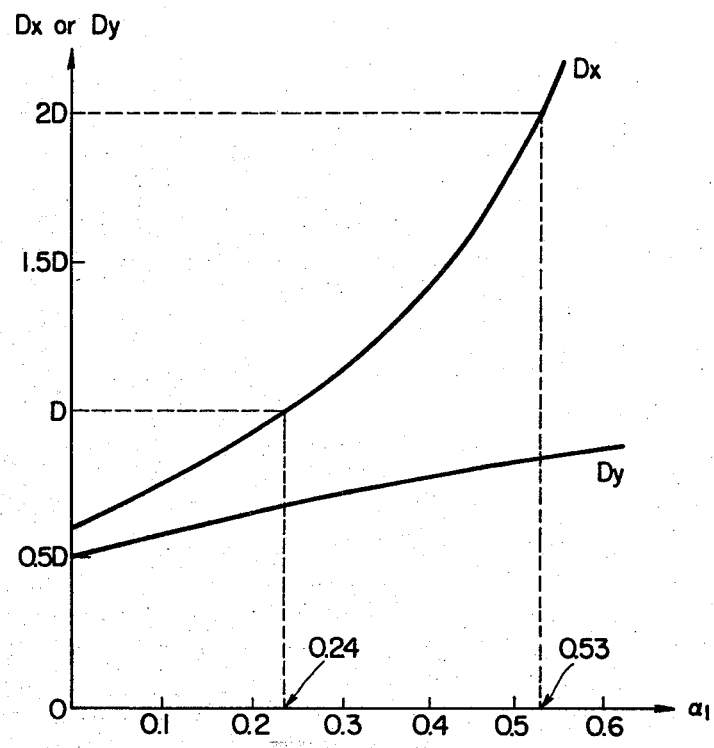
FIG. 3 is a graphical representation indicating the sizes Dx and Dy of dots which are provided according to the invention.

Applying equations (8) and (9) to equation (1), the size of the dot at which the energy density exceeds the threshold $E_T$ expressed by the equation (2) is obtained. Thus, the sizes Dx and Dy in the scanning direction and in the direction perpendicular to scanning direction of a dot recorded as shown in FIG. 2C are as indicated in FIG. 3. The dot configuration shown in FIG. 1E corresponds to $\alpha_1=0$ in FIG. 3.

It has been found that if the dot size Dx in the scanning direction meets the following condition, then the quality of a recorded image is improved substantially:

$$D<Dx<2D. \tag{10}$$

For condition (10), the bias component $\alpha_1$ of the modulation waveform should in the following range (11), more preferably in the following range (11'):

$$0.24<\alpha_1<0.53 \tag{11}$$

$$0.25 \leq \alpha_1 \leq 0.50 \tag{11'}$$

Figure 4:
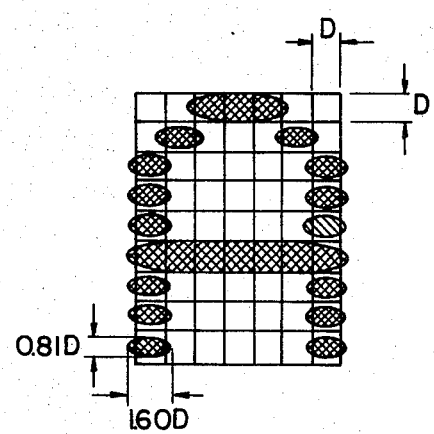
FIG. 4 is an explanatory diagram showing an image which is recorded according to one embodiment of the invention.

For instance, in the case of $\alpha_1=0.45$, $Dx=1.60D$ and $Dy=0.81D$. The character "A", as shown in FIG. 4, can be formed by arranging such dots on a 7×9 matrix form. In this pattern a single dot has a size of $Dx=1.60$ and $Dy=0.81$. However, if three or seven dots are continuously recorded side-by-side, the modulation is continuously in the "on" state. Accordingly, as in the case of a simple scanning exposure, the size of the dot in the direction perpendicular to the scanning direction is equal to D. Thus, the horizontal line of a character is recorded as a continuous line whose width, in the direction perpendicular to the scanning direction, is equal to D while the vertical line of the character is recorded as a series of dots each having a width in the scanning direction equal to 1.60D. Accordingly, the recorded character is, as a whole, in good balance and of high quality.

The bias component $\alpha_1$ of the modulation waveform can be readily changed by changing the modulation factor of an electrical signal which drives an optical modulator (which may be of the acousto-optic type or the electro-optic type) or a laser source (such as a semiconductor laser or an internal modulation type laser).

Thus, according to the invention, data can be recorded on a heat mode data recording material with a laser beam without the economical and technical difficulties in increasing the optical resolution and the scanning speed of the prior art methods. Furthermore, the invention is advantageous in that, while a laser beam whose diameter is about twice the scanning line width or the scanning line pitch is employed, degradation of the overall quality of the recorded image due to a reduction in the size of each dot is never caused and, on the contrary, the recorded image is, as a whole, in good balance and of high quality.

Especially, if, in recording data on a heat mode data recording material with a laser beam, the method of the invention is combined with a method such as disclosed in U.S. Pat. No. 4,125,842 in which data is carried on the zeroth diffraction light from an acousto-optic type optical modulator, then a laser data recording operation having a high light utilization efficiency can be carried out.

What is claimed is:

1. A laser data recording method in which data is recorded on a data recording material by scanning and modulating a laser beam, comprising the steps of:
   generating a scanning laser beam on said data recording material, said scanning laser beam having a substantially circular configuration and a diameter defined at an intensity value of $1/e^2$ of said laser beam of approximately twice a scanning line pitch on said data recording material; and
   intensity modulating said scanning laser beam in such a manner that a ratio of a laser beam intensity in an "on" state to a laser beam intensity in an "off" state is in a range of from 1:0.24 to 1:0.53 producing a varying voltage bias such that $D<Dx<2D$, where Dx acts as the dot size in the scanning direction and D is a recording width obtained when scanning exposure is carried out continuously between adjacent dot positions of said recording material.

2. The laser data recording method of claim 1 wherein said ratio of said laser beam intensity in the "on" state to said laser beam intensity in the "off" state is in a range of from 1:0.25 to 1:0.50.

3. The laser data recording method of claim 1 or claim 2 wherein a size Dy in a direction perpendicular to the scanning direction of said laser beam of a dot is smaller than the size Dx of said dot in a direction parallel to said scanning direction.

* * * * *